(12) United States Patent
Chou

(10) Patent No.: US 6,729,692 B1
(45) Date of Patent: May 4, 2004

(54) SEAT ANCHORING DEVICE

(75) Inventor: Joe Chou, Tai-Ping (TW)

(73) Assignee: Giant Manufacturing Co., Ltd., Taichung Hsien (TW)

( * ) Notice: Subject to any disclaimer, the term of this patent is extended or adjusted under 35 U.S.C. 154(b) by 0 days.

(21) Appl. No.: 10/446,423

(22) Filed: May 27, 2003

(51) Int. Cl.⁷ .............................................. A47C 31/00
(52) U.S. Cl. ................................................. 297/463.1
(58) Field of Search ....................... 297/215.13, 215.11, 297/203, 195.1, 463.1, 344.14; 280/511, 63; 403/24, 90, 104, 322.2; 248/420

(56) References Cited

U.S. PATENT DOCUMENTS

| 2,147,732 | A | * | 2/1939 | Boynton ..................... 280/261 |
| 2,892,486 | A | * | 6/1959 | Herring et al. ............. 248/420 |
| 4,546,991 | A | * | 10/1985 | Allen et al. ................. 280/282 |
| 4,714,028 | A | * | 12/1987 | Uredat-Neuhoff ........... 108/138 |
| 5,441,327 | A | * | 8/1995 | Sanderson ............... 297/195.1 |
| 5,513,895 | A | * | 5/1996 | Olson et al. ........... 297/215.14 |
| 6,039,394 | A | * | 3/2000 | Chen ....................... 297/195.1 |

FOREIGN PATENT DOCUMENTS

FR 2589120 A1 * 4/1987 .............. B62J/1/08

* cited by examiner

Primary Examiner—Milton Nelson, Jr.
(74) Attorney, Agent, or Firm—Christensen O'Connor Johnson Kindness PLLC

(57) ABSTRACT

A seat anchoring device includes a slide base coupled slidably to a seat support rod and formed with a roller chamber that extends along a longitudinal direction. The roller chamber is formed with a shallower section and a deeper section. A rolling member is disposed in the roller chamber and is movable along the longitudinal direction between the shallower and deeper sections to selectively arrest sliding movement of the slide base. A biasing member is disposed in the roller chamber for biasing the rolling member toward the shallower section. A release mechanism is mounted on the slide base and is operable so as to extend into the roller chamber and push the rolling member from the shallower section into the deeper section of the roller chamber against biasing action of the biasing member.

9 Claims, 5 Drawing Sheets

SEAT ANCHORING DEVICE

BACKGROUND OF THE INVENTION

1. Field of the Invention

The invention relates to an anchoring device, more particularly to a seat anchoring device for anchoring a bicycle seat on a bicycle frame.

2. Description of the Related Art

A conventional bicycle seat is usually anchored on an upright seat rod, which permits adjustment in the height of the bicycle seat but not in the distance between the bicycle seat and a handlebar. Moreover, during a height adjusting operation, if the user does not dismount, the seat rod will only slide downward by virtue of the user's body weight.

SUMMARY OF THE INVENTION

The object of the present invention is to provide a seat anchoring device that can overcome the aforesaid drawbacks of the prior art.

Accordingly, the seat anchoring device of the present invention comprises:

a seat support rod having a lower end and an upper end opposite to the lower end in a longitudinal direction, the seat support rod inclining rearwardly and upwardly from the lower end to the upper end;

a slide base adapted for mounting a seat thereon, the slide base having one side coupled slidably to the seat support rod such that the slide base is slidable on the seat support rod along the longitudinal direction, the side of the slide base being formed with a roller chamber that extends along the longitudinal direction, the roller chamber having a bottomwall, first and second ends opposite to each other in the longitudinal direction, and a depth that gradually increases in the longitudinal direction from the first end to the second end, thereby forming the roller chamber with a shallower section proximate to the first end and a deeper section between the shallower section and the second end;

a rolling member disposed in the roller chamber and in rolling contact with the seat support rod and the bottom wall of the roller chamber, the rolling member being movable in the roller chamber along the longitudinal direction between the shallower and deeper sections, the rolling member arresting sliding movement of the slide base in the longitudinal direction toward the lower end of the seat support rod when disposed in the shallower section of the roller chamber, and permitting sliding movement of the slide base along the seat support rod when disposed in the deeper section of the roller chamber;

a biasing member disposed in the roller chamber and biasing the rolling member toward the shallower section of the roller chamber; and a release mechanism mounted on the slide base and operable so as to extend into the roller chamber and push the rolling member from the shallower section into the deeper section of the roller chamber against biasing action of the biasing member.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
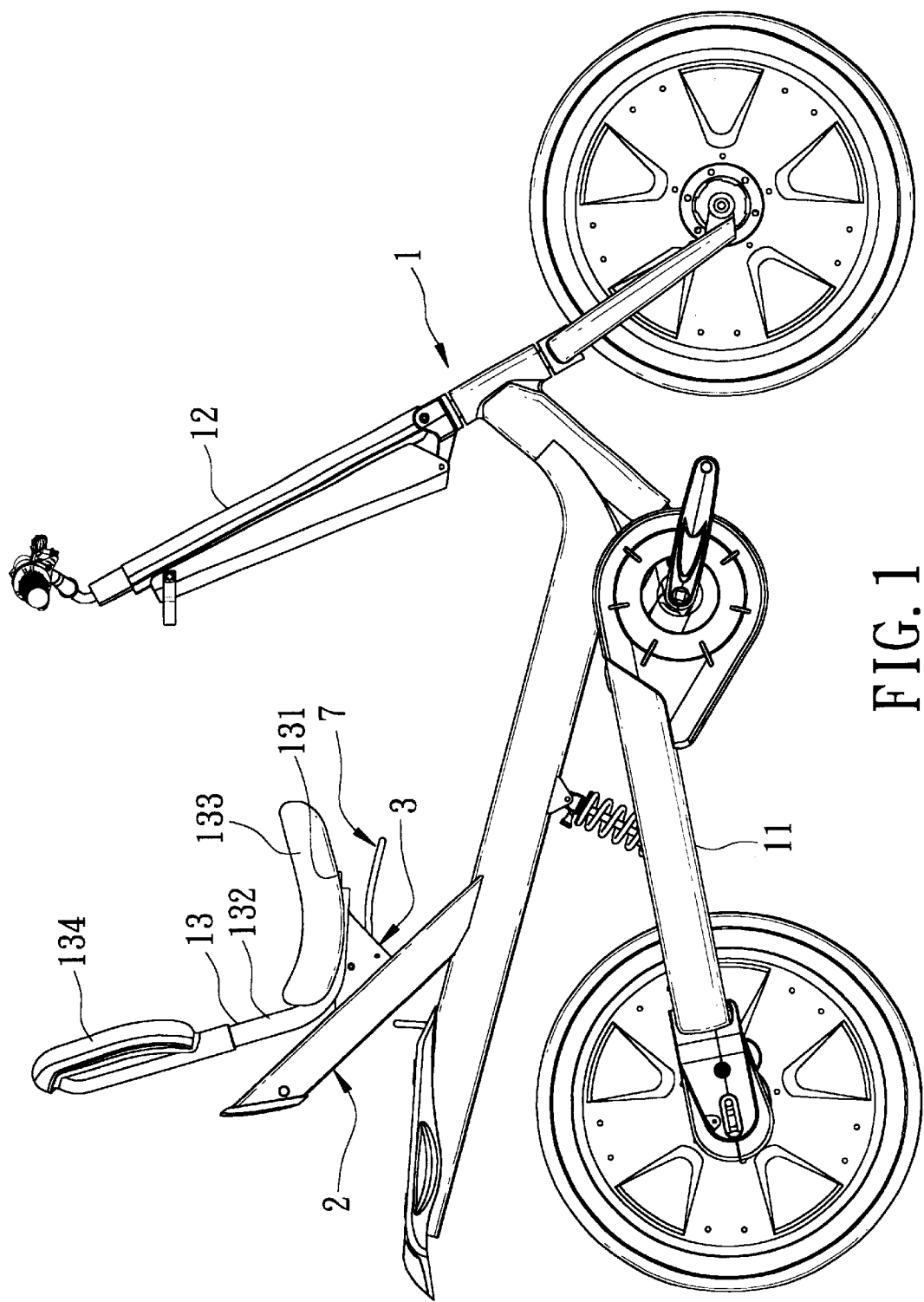
FIG. 1 is a schematic side view of a bicycle that incorporates the preferred embodiment of a seat anchoring device according to the present invention.
Figure 2:
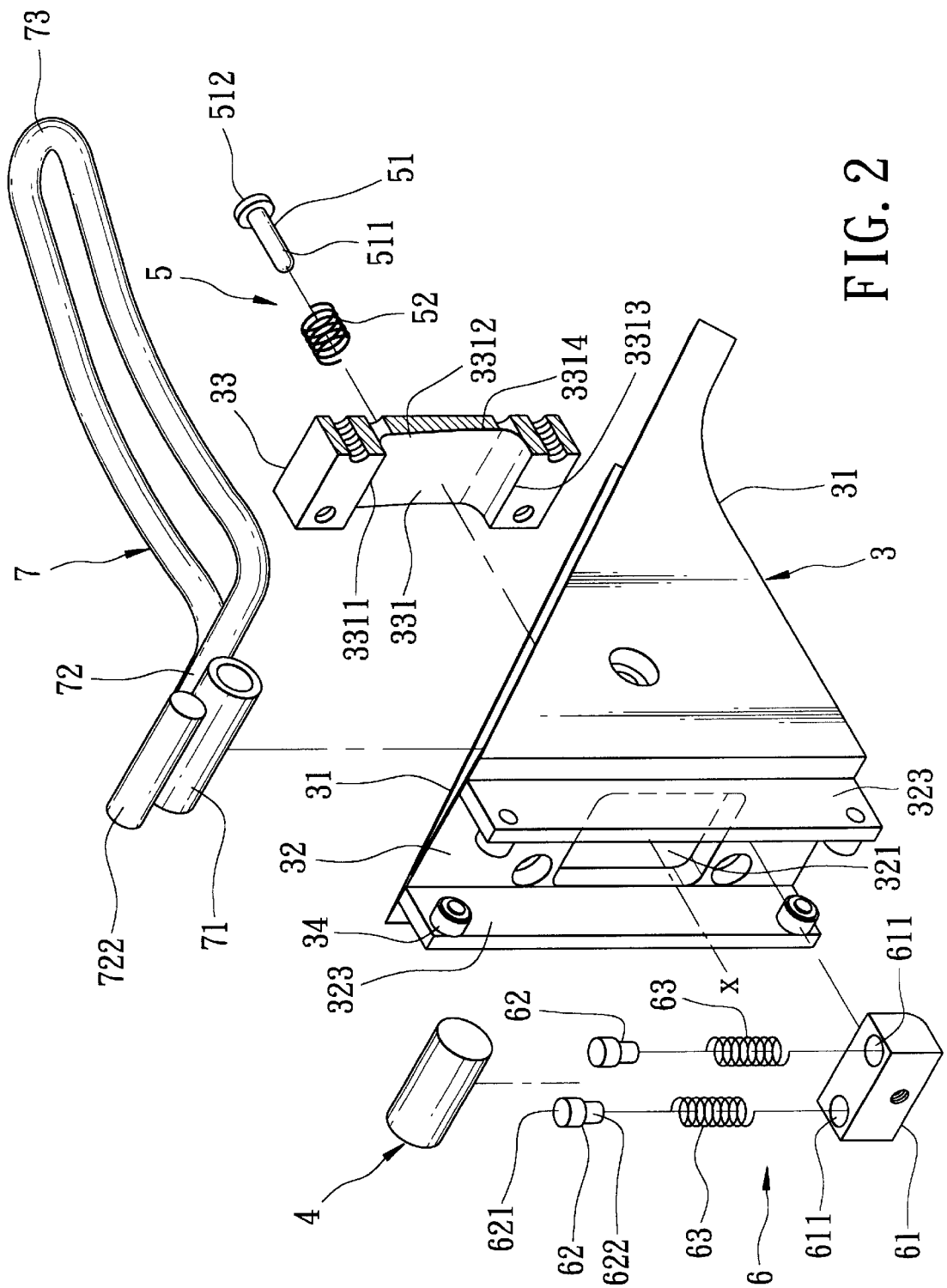
FIG. 2 is an exploded perspective view of the preferred embodiment.
Figure 3:
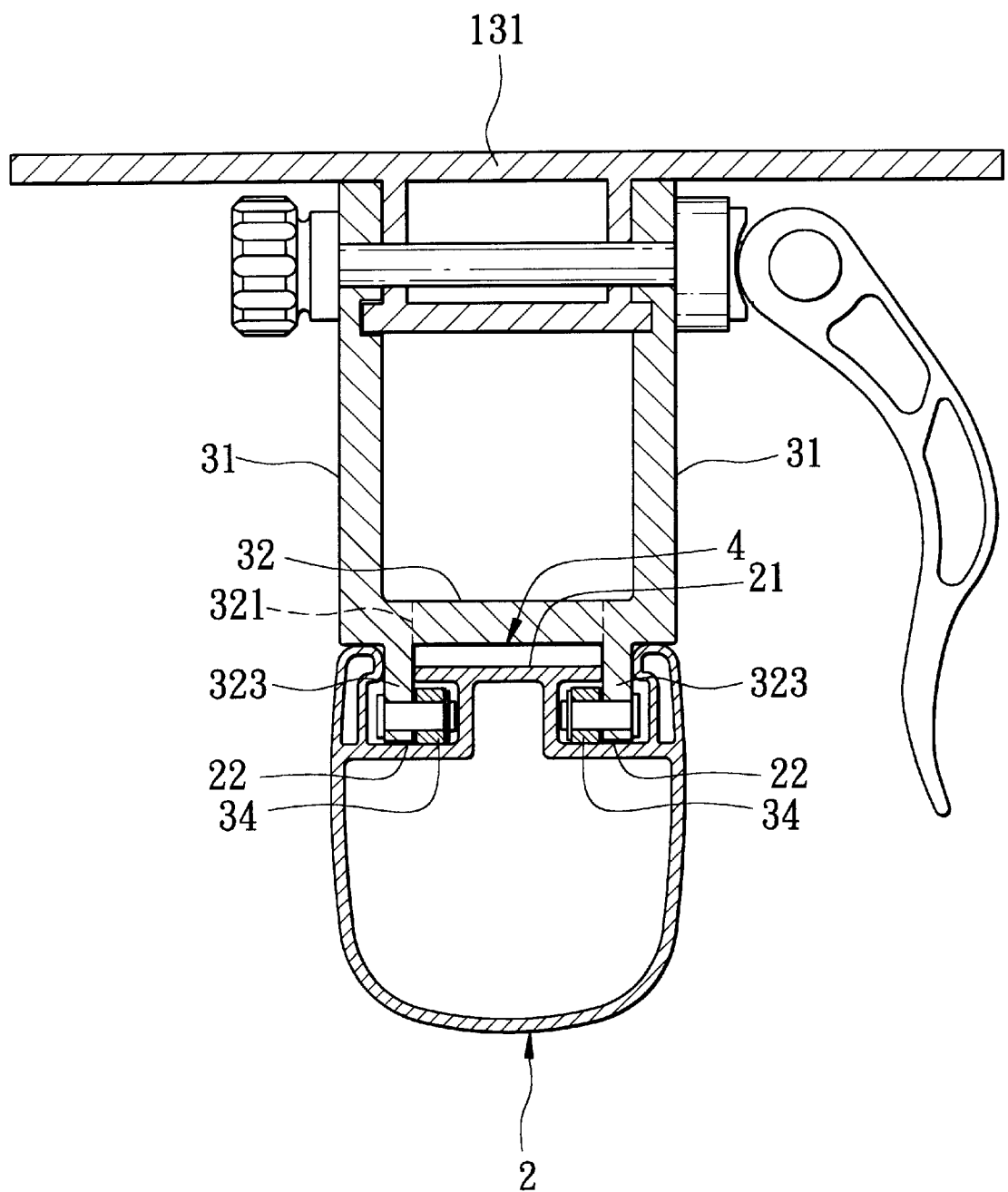
FIG. 3 is a schematic sectional view to illustrate coupling between a slide base and a seat support rod of the preferred embodiment.

Referring to FIG. 1, the preferred embodiment of a seat anchoring device according to the present invention is shown to be used in a bicycle 1. The bicycle 1 includes a bicycle frame 11, a handlebar mechanism 12 mounted on a front end of the bicycle frame 11, and a bicycle seat 13 anchored on the bicycle frame 11 by means of the seat anchoring device of this invention. The bicycle seat 13 includes a base plate 131, a generally L-shaped seat frame 132 mounted fixedly on the base plate 131, and a seat cushion 133 and a backrest cushion 134 mounted fixedly on the seat frame 132. With further reference to FIGS. 2 and 3, the seat anchoring device includes a seat support rod 2, a slide base 3, a rolling member 4, a biasing member 6, and a release mechanism.

The seat support rod 2 has a lower end and an upper end opposite to the lower end in a longitudinal direction, and inclines rearwardly and upwardly from the lower end to the upper end. The seat support rod 2 further has a top side 21 that is formed with a parallel pair of slide grooves 22 that extend in the longitudinal direction.

The slide base 3 includes a parallel pair of lateral plates 31, a bridging plate 32, a block member 33, and a plurality of rollers 34.

The lateral plates 31 are spaced apart from each other in a transverse direction transverse to the longitudinal direction. Each of the lateral plates 31 has a first edge for mounting of the base plate 131 of the seat 13 thereon, and a second edge extending inclinedly from the first edge.

The bridging plate 32 interconnects the second edges of the lateral plates 31, is formed with a through hole 321 that defines an axis (x), and is further formed with a pair of slide rails 323 that extend in the longitudinal direction and that are in sliding engagement with the slide grooves 22, respectively. Accordingly, the slide base 3 is slidable on the seat support rod 2 along the longitudinal direction.

The block member 33 is mounted on the bridging plate 32 and is disposed between the lateral plates 31. A roller chamber 331 is formed in the block member 33, is accessible from the through hole 321 in the bridging plate 32, and extends along the longitudinal direction. The roller chamber 331 has a bottom wall, first and second ends 3311, 3313 opposite to each other in the longitudinal direction, and a depth that gradually increases in the longitudinal direction from the first end 3311 to the second end 3313, thereby forming the roller chamber 331 with a shallower section 3312 proximate to the first end 3311 and a deeper section 3314 between the shallower section 3312 and the second end 3313.

The rollers 34 are mounted rotatably on the slide rails 323 to smoothen sliding engagement between the seat support rod 2 and the slide base 3.

Figure 4:
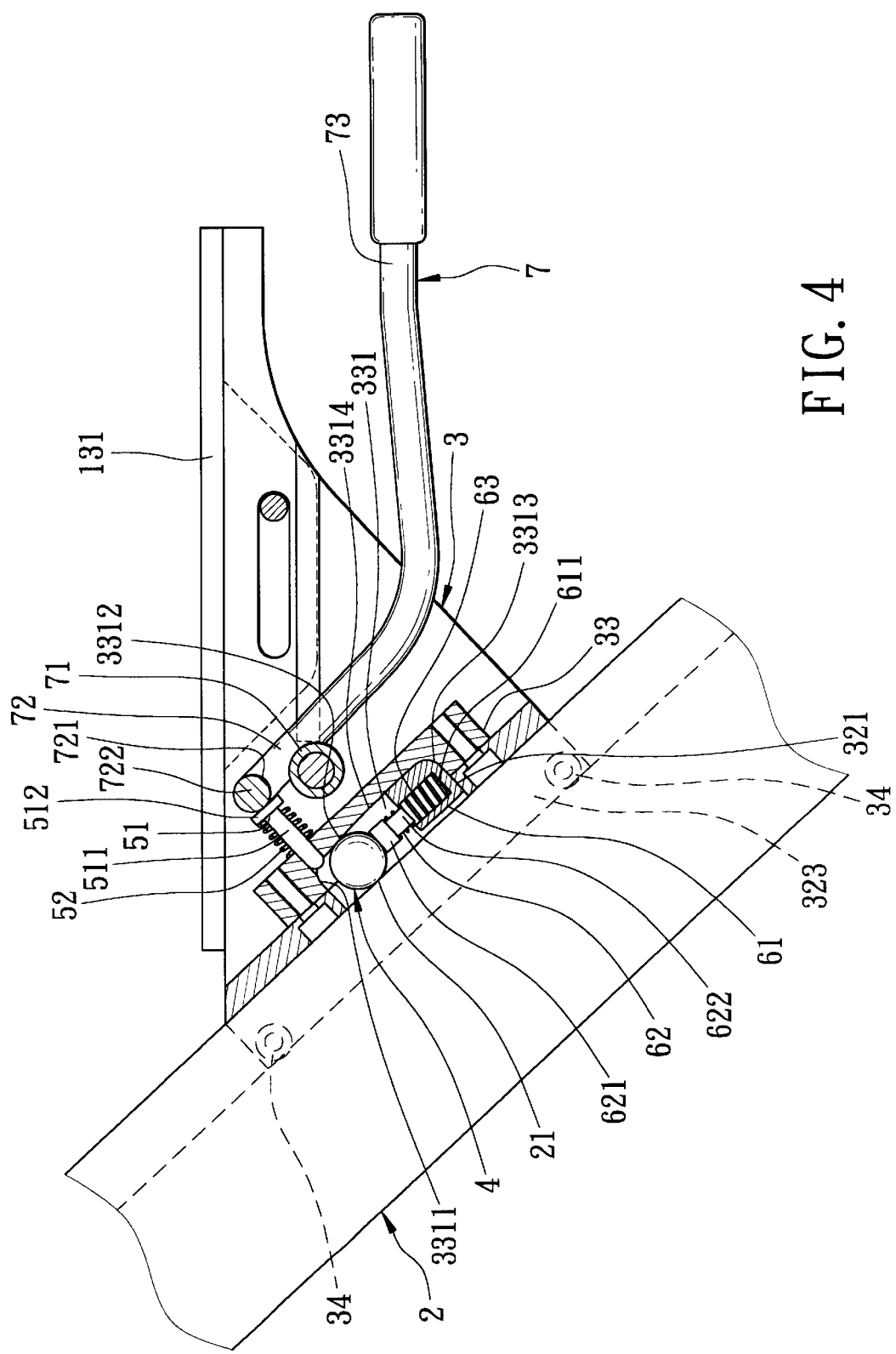
FIG. 4 is a fragmentary schematic sectional view of the preferred embodiment, illustrating how sliding movement of the slide base on the seat support rod is arrested.
Figure 5:
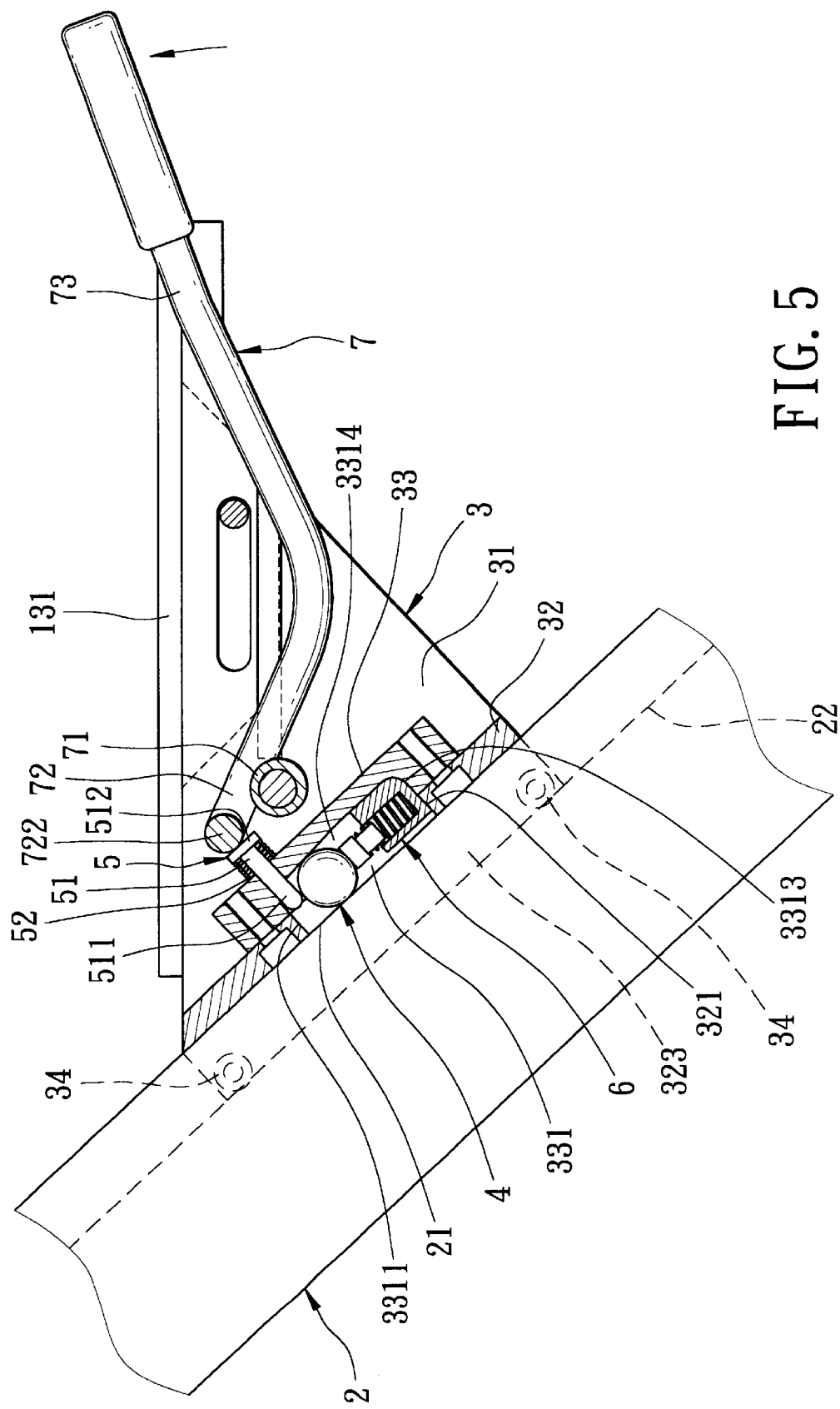
FIG. 5 is another fragmentary schematic sectional view of the preferred embodiment, illustrating how sliding movement of the slide base on the seat support rod is permitted.

Referring to FIGS. 2 and 4, the rolling member 4 is in the form of a cylinder, is disposed in the roller chamber 331, is in rolling contact with the bottomwall of the roller chamber 331, and extends through the through hole 321 in the bridging plate 32 to contact rollingly the top side 21 of the seat support rod 2. The rolling member 4 is movable in the roller chamber 331 along the longitudinal direction between the shallower and deeper sections 3312, 3314 such that the rolling member 4 arrests sliding movement of the slide base 3 in the longitudinal direction toward the lower end of the seat support rod 2 when disposed in the shallower section 3312 of the roller chamber 331, as best shown in FIG. 4, and permits sliding movement of the slide base 3 along the seat support rod 2 when disposed in the deeper section 3314 of the roller chamber 331, as best shown in FIG. 5.

The biasing member 6 includes an anchoring block 61, a pair of push pins 62, and a pair of coiled compression springs 63. The anchoring block 61 is mounted fixedly in the roller chamber 331 proximate to the second end 3313, and is formed with a pair of spring holes 611. Each of the push pins 62 includes a pin head 621 abutting against the rolling member 4, and a pin rod 622 aligned with a corresponding spring hole 611. Each of the compression springs 63 has one end sleeved on the pin rod 622 of the corresponding push pin 62, and an opposite end received in a corresponding spring hole 611. The opposite ends of the compression springs 63 thus act on the rolling member 4 and the second end 3313 of the roller chamber 331, respectively, so as to bias the rolling member 4 toward the shallower section 3312 of the roller chamber 331.

The release mechanism includes a spring-loaded actuator 5 and an operating lever 7.

The spring-loaded actuator 5 includes a push rod 51 and a biasing spring 52. The push rod 51 includes a push head 512 disposed on one side of the block member 33 opposite to the roller chamber 331, and a shank section 511 extending from the push head 512 along the axis (x) and extendible into the shallower section 3312 of the roller chamber 331 for pushing the rolling member 4 from the shallower section 3312 into the deeper section 3313 of the roller chamber 331, as best shown in FIG. 5. The biasing spring 52 is a coiled compression spring sleeved on the shank section 511 and having opposite ends acting, on the block member 33 and the push head 512, respectively.

The operating lever 7 has a pivot portion 71 mounted pivotally between the lateral plates 31 of the slide base 3, and a handle portion 73 and a press portion 72 extending respectively from opposite sides of the pivot portion 71. The press portion 72 has one end 721 that extends toward the spring-loaded actuator 5, and that is formed with a contact part 722 that abuts against the push head 512 of the spring-loaded actuator 5. The handle portion 73 extends out of the slide base 3 and is disposed under the bicycle seat 13. The handle portion 73 is operable so as to pivot the operating lever 7 about the pivot portion 71 and so as to cause the contact part 722 of the press portion 72 to force the spring-loaded actuator 5 to extend into the shallower section 3312 of the roller chamber 331 for pushing the rolling member 4 from the shallower section 3312 into the deeper section 3313 of the roller chamber 331 (see FIG. 5).

Referring to FIG. 4, under normal conditions, by virtue of the biasing action of the compression springs 63 of the biasing member 6, the push pins 62 will push the rolling member 4 to move toward the first end 3311 of the roller chamber 331 such that the rolling member 4 is disposed in the shallower section 3312 and arrests sliding movement of the slide base 3 toward the lower end of the seat support rod 2, thereby anchoring the bicycle seat 13 on the seat support rod 2. At this time, although the slide base 3 bears the weight of the user and thus has a tendency to move downward, since the depth of the roller chamber 331 is designed to gradually decrease in the longitudinal direction from the second end 3313 to the first end 3311, the arresting force of the rolling member 4 at the shallower section 3312 is increased, thereby stably anchoring the bicycle seat 13 on the seat support rod 2.

Referring to FIG. 5, when the handle portion 73 of the operating lever 7 is operated, the operating lever 7 will push the push rod 51 of the spring-loaded actuator 5 through the contact part 722 of the press portion 72, thereby driving the shank section 511 to extend into the roller chamber 331 against the biasing force of the biasing spring 52, and to push the rolling member;4 toward the second end 3313 of the roller chamber 331 and into the deeper section 3314. Since the rolling member 4 can freely rotate in the deeper section 3314, the slide base 3 can be slid smoothly along the slide grooves 22 of the seat support rod 2 via the rollers 34 until the handle portion 73 is released. When the handle portion 73 is released, the restoring actions of the biasing member 6 and the spring-loaded actuator 5 ensure that the slide base 3 is once again anchored at a certain point on the seat support rod 2. As shown in FIG. 1, since the seat support rod 2 inclines rearwardly and upwardly, when the slide base 3 slides along the seat support rod 2, apart from adjusting the height of the bicycle seat 13 on the slide base 3, the distance of the bicycle seat 13 from the handlebar mechanism 12 will be adjusted as well.

It has thus been shown that the seat anchoring device of the present invention is convenient to use since it merely involves simple lever operations and does not require dismounting of the user.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A seat anchoring device comprising:
    a seat support rod having a lower end and an upper end opposite to said lower end in a longitudinal direction, said seat support rod inclining rearwardly and upwardly from said lower end to said upper end;
    a slide base adapted for mounting a seat thereon, said slide base having one side coupled slidably to said seat support rod such that said slide base is slidable on said seat support rod along the longitudinal direction, said one side of said slide base being formed with a roller chamber that extends along the longitudinal direction, said roller chamber having a bottom wall, first and second ends opposite to each other in the longitudinal direction, and a depth that gradually increases in the longitudinal direction from said first end to said second end, thereby forming said roller chamber with a shallower section proximate to said first end and a deeper section between said shallower section and said second end;
    a rolling member disposed in said roller chamber and in rolling contact with said seat support rod and said bottom wall of said roller chamber, said rolling member being movable in said roller chamber along the longitudinal direction between said shallower and deeper sections, said rolling member arresting sliding movement of said slide base in the longitudinal direction toward said lower end of said seat support rod when disposed in said shallower section of said roller chamber, and permitting sliding movement of said slide base along said seat support rod when disposed in said deeper section of said roller chamber;

a biasing member disposed in said roller chamber and biasing said rolling member toward said shallower section of said roller chamber; and a release mechanism mounted on said slide base and operable so as to extend into said roller chamber and push said rolling member from said shallower section into said deeper section of said roller chamber against biasing action of said biasing member.

2. The seat anchoring device as claimed in claim 1, wherein said slide base includes:

- a pair of lateral plates spaced apart from each other in a transverse direction transverse to the longitudinal direction, each of said lateral plates having a first edge for mounting of the seat thereon, and a second edge extending inclinedly from said first edge;
- a bridging plate interconnecting said second edges of said lateral plates and defining said one side of said slide base; and
- a block member mounted on said bridging plate and disposed between said lateral plates;
- wherein said roller chamber is formed in said block member, and said bridging plate is formed with a through hole that permits said rolling member to contact rollingly said bottom wall of said roller chamber and said seat support rod.

3. The seat anchoring device as claimed in claim 2, wherein one of said seat support rod and said bridging plate of said slide base is formed with a slide groove that extends in the longitudinal direction, the other one of said seat support rod and said bridging plate of said slide base being formed with a slide rail that extends in the longitudinal direction and that is in sliding engagement with said slide groove.

4. The seat anchoring device as claimed in claim 3, wherein said slide rail has a roller mounted rotatably thereon to smoothen sliding engagement between said seat support rod and said slide base.

5. The seat anchoring device as claimed in claim 2, wherein said release mechanism includes a spring-loaded actuator mounted on said slide base and operable so as to extend into said shallower section of said roller chamber for pushing said rolling member from said shallower section into said deeper section of said roller chamber.

6. The seat anchoring device as claimed in claims 5, wherein said release mechanism further includes an operating lever having a pivot portion mounted pivotally between said lateral plates of said slide base, and a handle portion and a press portion extending respectively from opposite sides of said pivot portion, said press portion extending toward and abutting against said spring-loaded actuator, said handle portion being operable so as to pivot said operating lever about said pivot portion and so as to cause said press portion to force said spring-loaded actuator to extend into said shallower section of said roller chamber.

7. The seat anchoring device as claimed in claim 1, wherein said biasing member includes a coiled compression spring having opposite ends acting on said rolling member and said second end of said roller chamber, respectively.

8. The seat anchoring device as claimed in claim 1, wherein said release mechanism includes a spring-loaded actuator mounted on said slide base and operable so as to extend into said shallower section of said roller chamber for pushing said rolling member from said shallower section into said deeper section of said roller chamber.

9. The seat anchoring device as claimed in claim 8, wherein said release mechanism further includes an operating lever mounted pivotally on said slide base and operable so as to force said spring-loaded actuator to extend into said shallower section of said roller chamber.

* * * * *